(12) United States Patent
Kato

(10) Patent No.: US 6,296,432 B1
(45) Date of Patent: Oct. 2, 2001

(54) BOLT WITH EXTENSION TO PREVENT THREAD MISALIGNMENT

(75) Inventor: Takashi Kato, Nagoya (JP)

(73) Assignee: Meidoh Co., Ltd., Toyota (JP)

( * ) Notice: Subject to any disclaimer, the term of this patent is extended or adjusted under 35 U.S.C. 154(b) by 0 days.

(21) Appl. No.: 09/586,063

(22) Filed: Jun. 2, 2000

(30) Foreign Application Priority Data

Jul. 13, 1999 (JP) .................................................. 11-198625
Mar. 24, 2000 (JP) .................................................. 12-084534

(51) Int. Cl.⁷ .................................................. F16B 25/00
(52) U.S. Cl. ........................................... 411/386; 411/423
(58) Field of Search .................................. 411/386, 423, 411/424, 414, 412

(56) References Cited

U.S. PATENT DOCUMENTS

| | | | |
|---|---|---|---|
| 2,021,704 | * 11/1935 | Thatcher | 411/423 |
| 2,113,600 | * 8/1938 | Olson | 411/386 |
| 3,527,136 | * 9/1970 | Wilson | 411/386 |
| 3,878,759 | * 4/1975 | Carlson | 411/423 |
| 5,234,301 | * 8/1993 | Grossberndt | 411/386 |
| 6,089,806 | * 7/2000 | Reynolds | 411/386 |

\* cited by examiner

Primary Examiner—Flemming Saether
(74) Attorney, Agent, or Firm—Cooper & Dunham LLP; Donald S. Dowden

(57) ABSTRACT

A bolt is provided in the present invention. When said bolt is screwed in a nut, said bolt is guided by engaging the spiral guide groove of said guide boss with the thread of the nut to prevent the encroaching, the seizure, or the racing between the bolt and the nut.

6 Claims, 2 Drawing Sheets

BOLT WITH EXTENSION TO PREVENT THREAD MISALIGNMENT

FIELD OF THE INVENTION

The present invention relates to a bolt having a guide boss to prevent the oblique screwing in a female screw, more particularly, a bolt having an axle with thread and a guide boss formed at the end of said axle wherein said guide boss has a little smaller external diameter than an internal diameter of the female screw in which said bolt is screwed and a spiral guide groove is formed on said guide boss, said spiral guide groove connects to the root of said thread of said axle and has the same pitch as a pitch of said thread of said axle.

DESCRIPTION OF THE PRIOR ART

Hithereto, it has been known that the encroaching, the seizure, or the racing between a bolt and a nut is caused by an oblique screwing of the bolt in the nut. To prevent said oblique screwing, a bolt (201) having a guide boss as shown in FIG. 3 has been provided. Said bolt (201) consists of a head (202), an axle (203) with a thread (203A) and a guide boss (204) formed at the end of said axle (203) and an external diameter Db of said guide boss (204) is set to be a little smaller than an internal diameter Dn of the nut (205) in which said bolt (201) is screwed.

When said bolt (201) is screwed in said nut (205), since said guide boss (204) having a little smaller external diameter Db than the internal diameter Dn of said nut (205) is first inserted in a female screw (205A) of said nut (205), the oblique screwing of said bolt (201) may be substantially amended.

Nevertheless, since a little play exists between said guide boss (204) of said bolt (201) and the inside (205C) of said nut (205), it is impossible to dissolve the oblique screwing completely and the problems of the encroaching, the seizure or the racing still remain.

OBJECT OF THE INVENTION

Accordingly, the object of the present invention is to provide a bolt having a guide boss which effectively prevents the encroaching, the seizure, or the racing by means of the oblique screwing.

SUMMARY OF THE INVENTION

Said object may be attained by a bolt having an axle with a thread and a guide boss formed at the end of said axle wherein said guide boss has a little smaller external diameter than a internal diameter of a female screw in which said bolt is screwed and a spiral guide groove is formed on said guide boss, and said spiral guide groove connects to a root of said thread of said axle, has the same pitch as a pitch of said thread of said axle and is deeper than said thread of said axle excepting both end parts of said spiral guide groove.

In said bolt (101) it is preferable that said thread has an incomplete thread from the front most end S to a fixed thread position, said incomplete thread the height of which is gradually increasing from O to the height of said complete thread has a range of an angle on the circumference of said axle between 50° and 100°.

Further it is preferable that said spiral guide groove is set to be deeper than said thread of said axle excepting both end parts of said spiral guide groove and at the rear most end connecting to a root of said thread of said axle, said spiral guide groove is set to be gradually shallower toward said axle so that the root of said spiral guide groove is situated at the same level as the root of said thread of said axle.

And further, it is preferable that the depth of said spiral guide groove excepting both end parts of said spiral guide groove is set to be between 10 and 70% of the depth of the thread of the female screw.

When said bolt (101) is screwed in the female screw (105A) of a nut (105), even if said bolt (101) is obliquely screwed in said female screw (105A) of said nut (105), since said spiral guide groove (104A) is formed on the circumference of said guide boss (104) of said bolt (101), during screwing said bolt (101) in said female screw (105A) of said nut (105), the thread of said nut (105) engaging with the spiral guide groove (104A) of said guide boss (104) progresses toward the thread of said bolt (101) guided by said spiral guide groove (104A).

When the front most end of the thread (105B) of said nut (105) reaches the rear most end E of the spiral guide groove (104A) of said boss (104) and the thread (105B) of said nut (105) is then engaging with the thread (103A) of said axle (103) of said bolt (101) to amend the oblique screwing of said bolt (101). Thus the oblique screwing of said bolt (101) is amended and said bolt (101)is further screwed in said nut (105) and the thread (105B) of said nut (105) is introduced in the thread (103A) of said bolt (101) by rotating propulsion of said bolt (101) from the spiral guide groove (104A) of said guide boss (104) to engage together.

As above described, the oblique screwing of said bolt (101) to the female screw (105A) of said nut (105) is amended to prevent effectively the encroaching, the seizure, or the racing between said bolt (101) and said nut (105).

BRIEF DESCRIPTION OF THE DRAWINGS

FIG. 1 is a side view of a bolt having a guide boss.

FIG. 2 is a partial sectional view showing the oblique screwing of said bolt in a nut.

DETAILED DESCRIPTION AND EXAMPLES

Figure 1:
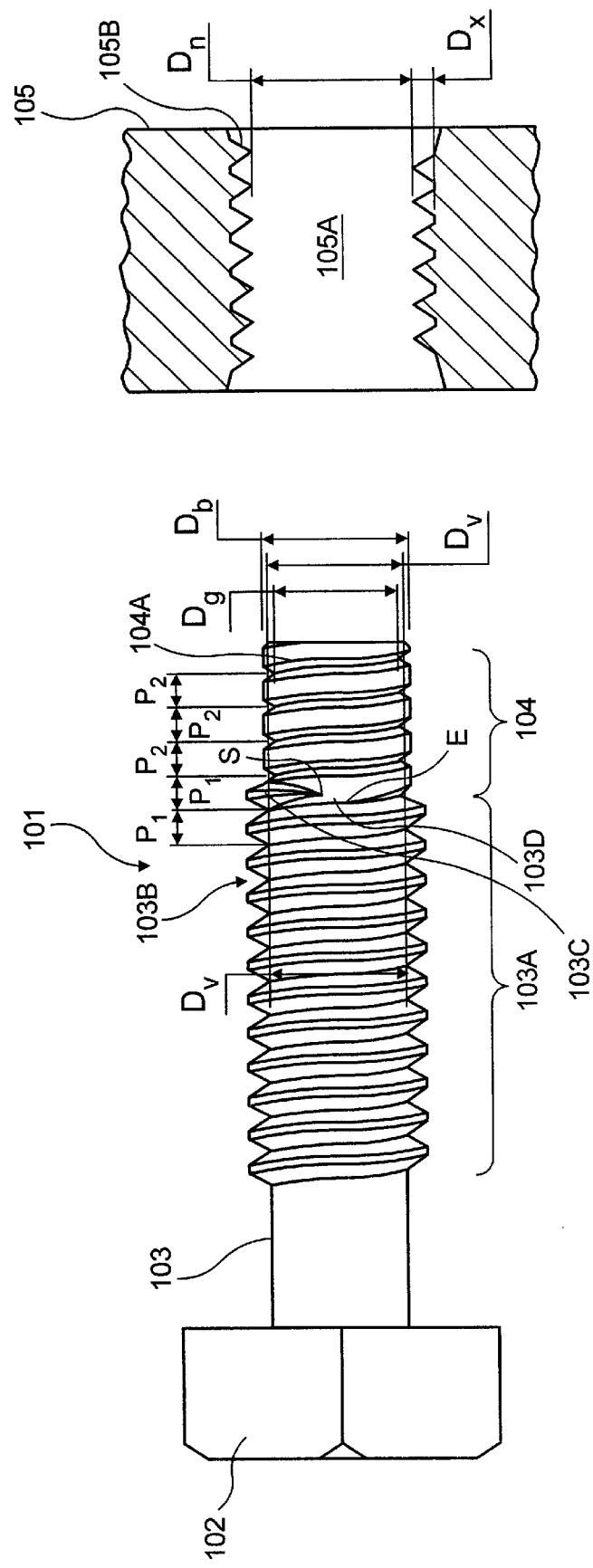
FIG. 1 and FIG. 2 relate to an embodiment of the present invention.
Figure 2:
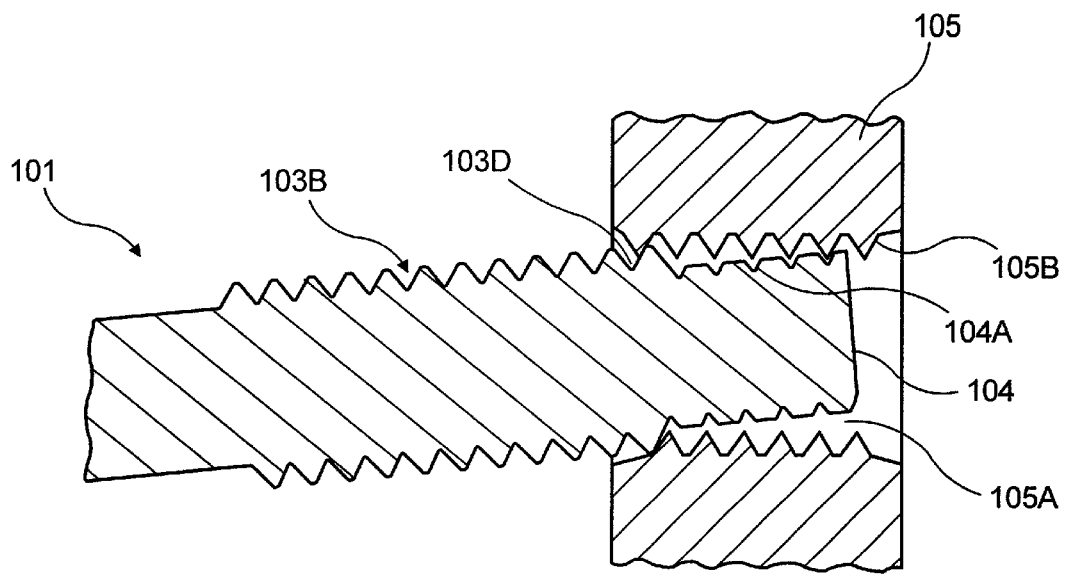
Figure 3:
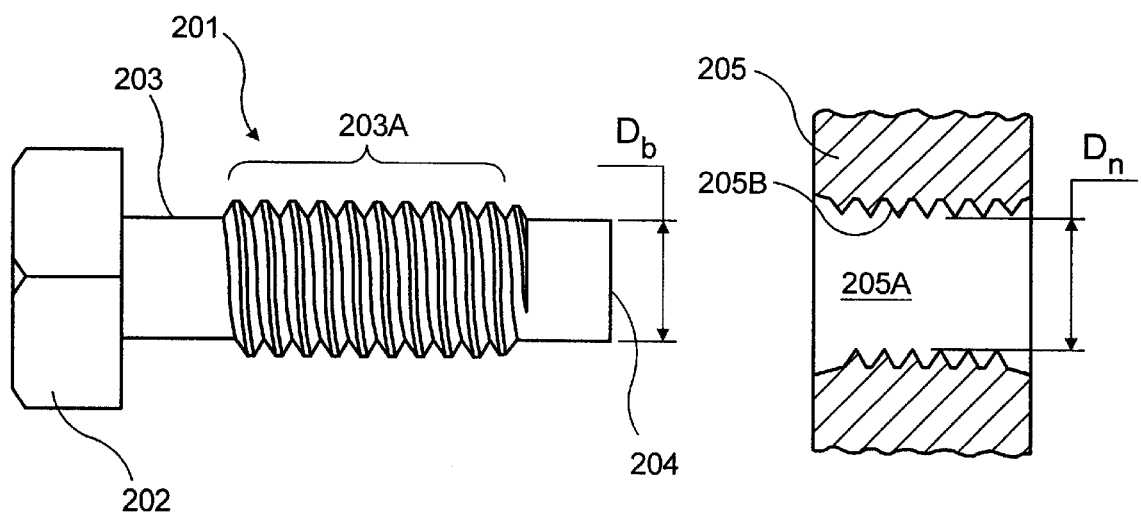
FIG. 3 is a side view of a traditional bolt having a guide boss.

FIG. 1 shows a bolt having a guide boss relating to an embodiment of the present invention.

Referring to FIG. 1, said bolt (101) consists of a head (102), an axle (103), a thread (103A) formed on the circumference of said axle (103), and a guide boss (104) formed at the end of said axle (103). Said thread has an incomplete thread from the front most end S to a fixed thread position, said incomplete thread the height of which is gradually increasing from 0 to the height of said complete thread has a range of an angle on the circumference of said axle between 50° and 100°. The external diameter Db of said guide boss (104) is set to be a little smaller than the internal diameter Dn of a nut (105) in which said bolt (101) is screwed. Further said external diameter Db of said guide boss (104) is set to be a little larger than the root diameter Dv (diameter between the root diameter and root of the thread) of the thread (103A) of said axle (103). In this embodiment, the end of said guide boss (104) is beveled.

A spiral guide groove (104A) is formed on the circumference of said guide boss (104). Said spiral guide groove (104A) connects to the root (103B) of said thread (103A) of said axle (103) so that the rear most end of said spiral guide groove (104A) is situated at the front most end of the root (103B) of said thread (103A) and said spiral guide groove (104A) has the same pitch $P_2$ as the pitch $P_1$ of the thread (103A) of said axle (103) ($P_1=P_2$)

It is preferable that said spiral guide groove (104A) of said guide boss (104) is deeper than the thread (103A) of said axle (103) excepting both end parts of said spiral guide groove (104A) and preferably the depth of said spiral guide groove (104A) is set to be between 10 and 70% of the internal thread (105B) of a nut (105) in which said bolt (101) is screwed.

Assuming the root diameter (diameter between root and root of thread) of said thread (103A) is Dv, the root diameter of said guide thread is Dg and the height of said thread (105B) of said nut (105) is Dx.

0.1 Dx<(Dv−Dg)/2<.7 Dx

Further the rear end of said spiral guide groove (104A) is set to be gradually shallower toward said axle (103) so that the root (104B) of said spiral guide groove (104A) is situated at the same level as the root (103B) of said thread (103A) of said axle (103).

When said bolt is screwed in the female screw (105A) of said nut (105), first said guide boss 104 is inserted into the female screw (105A) of said nut (105). Since the external diameter Db of said guide boss (104) is a little smaller than the internal diameter Dn of the female screw (105A) of said nut (105), said guide boss (104) is guided by the female screw (105) of said nut (105) to amend the oblique screwing of said bolt (101) in said nut (105).

Even if said bolt is obliquely screwed in said nut (105) by means of play between said guide boss (104) and the female screw (105A) of said nut (105), since the spiral guide groove (104A) is formed on the circumference of said guide boss (104), during screwing said bolt (101) in the female screw (105A) of said nut (105), the spiral guide groove (104A) of said guide boss (104) of said bolt (101) is engaging with the thread (105B) of said female screw (105A) of said nut (105) and the thread (105B) of said nut (105) engaging with the spiral guide groove (104A) of said guide boss (104) is guided by propulsion of the spiral guide groove (104A) to progresses toward the thread of said bolt (101).

When the front most end of the thread (105B) of said nut (105) reaches the rear most end E of the spiral guide groove (104A), said thread (105B) of said nut (105) is introduced to the thread (103A) of said axle (103) to amend said oblique screwing of said bolt (101). Since the rear most end of the spiral guide groove (104A) is set to be gradually shallower so that the root (104B) of the spiral guide groove (104A) is situated at the same level as the root (103B) of the thread (103A) of said axle (103), and the thread (105B) of said nut (105) is smoothly introduced in the thread (103A) of said axle (103) of said bolt (101).

As above described, the oblique screwing of said bolt (101) is amended and the thread (103A) of said bolt (101) and the thread (105B) of said nut normally engage together to prevent the encroaching, the seizure, or the racing caused by the oblique screwing of the bolt. Also, the encroaching caused by the oblique screwing of the bolt is more effectively prevented by said incomplete thread having the range of the angle on the circumference of said axle between 50° and 100.°

It may be considered that the guide thread is formed on the circumference of said guide boss instead of said spiral guide groove. In this case said guide thread of said guide boss engages with the thread of the nut to introduce the thread of the nut into the thread of the bolt. Nevertheless, introducing the thread of the nut into the spiral guide groove of the guide boss is more smoothly carried out without any obstruction between the threads comparing the case of introducing the thread of the nut into the guide thread of the guide boss.

It is to be understood that the inventor is not limited to the procedures and embodiments hereinabove specifically set forth, but may be carried out in other ways without departure from its spirit.

For instance, the rear most end E of the spiral guide groove (104A) may be set to be situated over the front most end of the thread (103A) between the threads (103A).

Further beveling of the circumference of the end of said guide boss is not always necessary for the present invention.

Still further, the shape of the head of the bolt may not be limited to only hexagon but the flange may be attached to the head or stud bolt is also an object of the present invention.

What is claimed is:

1. A bolt which is screwed into a female screw, said bolt having an axle with a thread and a guide boss extending from the front end of said axle wherein said thread has a root and said guide boss has an external diameter smaller than an internal diameter of a female screw in which said bolt is screwed and a spiral guide groove is formed on said guide boss, and said spiral guide groove connects to said thread of said axle, said spiral groove has the same pitch as a pitch of said thread of said axle, and the root of said spiral guide groove is situated at a deeper position than the root of said thread except for both end parts of said spiral guide groove.

2. A bolt in accordance with claim 1 wherein said thread comprises an incomplete thread portion extending from the front end to a fixed thread position, said incomplete thread portion has a height gradually increasing from 0 to the height of said thread at said fixed position, and said incomplete thread portion extends over an arc on the circumference of said axle of between 50° and 100°.

3. A bolt according to claim 2 wherein the root of said spiral guide groove is situated at a deeper position than said root of said thread of said axle except for both end parts of said spiral guide groove and the root of said spiral guide groove connects to the root of said thread, wherein said spiral guide groove is gradually shallower toward said thread of said axle so that the rear end of said groove root is situated at the same level as the root of said thread.

4. A bolt in accordance with claim 3 wherein the depth of said spiral guide groove except for both end parts of said spiral guide groove is between 10 and 70% of the depth of the thread of the female screw in which said bolt is screwed.

5. A bolt in accordance with claim 1 wherein the root of said spiral guide groove is situated at a deeper position than said root of said thread of said axle except for both end parts of said spiral guide groove and the root of said spiral guide groove connects to the root of said thread, wherein said spiral guide groove is gradually shallower toward said thread of said axle so that the rear end of said groove root is situated at the same level as the root of said thread.

6. A bolt in accordance with claim 3 wherein the depth of said spiral guide groove except for both end parts of said spiral guide groove is between 10 and 70% of the depth of the thread of the female screw in which said bolt is screwed.

* * * * *